Nov. 1, 1927.                                                         1,647,704
J. E. LEA
APPARATUS FOR THE VOLUMETRIC MEASUREMENT OF GRANULAR MATERIALS
Filed May 8, 1926          2 Sheets-Sheet 1

Inventor:-
James Edward Lea
Walter Gunn.

By his Attorney:-

Nov. 1, 1927. 1,647,704
J. E. LEA
APPARATUS FOR THE VOLUMETRIC MEASUREMENT OF GRANULAR MATERIALS
Filed May 8, 1926   2 Sheets-Sheet 2

Inventor:
James Edward Lea
By his Attorney: Walter Gunn

Patented Nov. 1, 1927.

1,647,704

UNITED STATES PATENT OFFICE.

JAMES EDWARD LEA, OF MANCHESTER, ENGLAND.

APPARATUS FOR THE VOLUMETRIC MEASUREMENT OF GRANULAR MATERIALS.

Application filed May 8, 1926, Serial No. 107,781, and in Great Britain May 19, 1925.

This invention relates to apparatus for effecting the volumetric measurement of granular materials, and more particularly to that type of such measuring apparatus wherein the material passes along on an endless travelling band or conveyor and is carried below a measuring element. In such apparatus the material usually passes from a hopper direct on to the conveyor, a maximum depth control being obtained from the front wall of the hopper under which the material passes, or from an adjustable slide or sluice at that position forming a regulator. Such arrangement while effectively distributing the material when the hopper is full, requires to be readjusted if the feed supply to the hopper is insufficient to keep the hopper full, otherwise the material passes on the belt in small heaps as it enters the hopper and inaccurate readings result. The tendency is therefore, to set this slide for the slowest supply, thereby obtaining correct readings but decreasing the measuring capacity of the machine for a given time.

The object of the invention is to provide means for ensuring the more accurate, rapid, automatic, and efficient working of such apparatus, and the features of the invention are hereafter described and set out in the appended claims.

The accompanying drawings illustrate the invention in which:—

Figure 1:
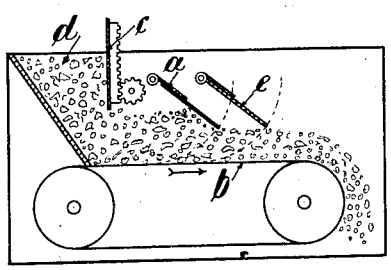
Figs. 1 to 6 show diagrammatically various forms of this invention.
Figure 2:
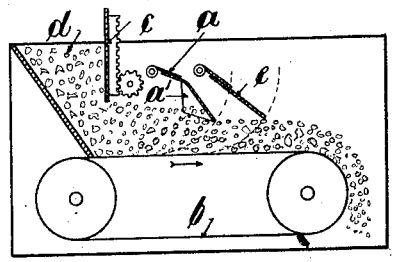
Figure 3:
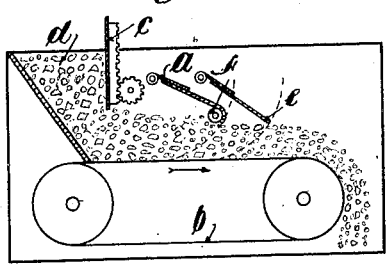
Figure 4:
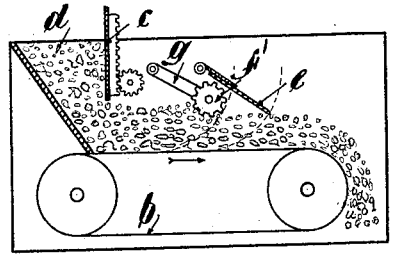

In one form of the invention as shown in Fig. 1, a weighted member or "scrabbler" $a$ extending the full width of the conveyor $b$ is pivotally arranged above the conveyor, between the adjustable sluice $c$ of the hopper $d$ and the measuring plate or element $e$, so as to rise and fall with the depth of the material and by its weight spread it across the full width of the conveyor. In Fig. 2 the "scrabbler" $a$ is slightly bent, the lower end being provided with a wedge shaped face or projection $a^1$ of a small or flat angle so as to engage the material on the conveyor to lift and spread it towards the sides giving a combined rake and ploughlike action. In Fig. 3, the lower end of the "scrabbler" is provided with a fixed round bar $f$ and in Fig. 4 a toothed or serrated roller $f^1$ is provided, the roller being of comparatively large diameter and pivoted from links $g$ which replace the plate or body of the "scrabbler" shown in the previous examples.

Figure 5:
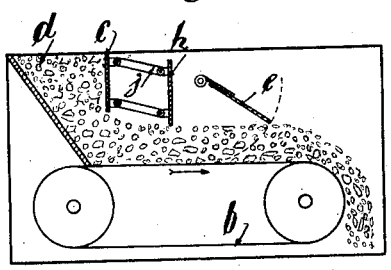

While the "scrabbler" may be a pivoted member swinging above the conveyor and inclined as it slides on the surface of the material, it may, in another construction, as shown in Fig. 5, comprise a plate $h$ or member mounted by a system of parallel links $j$ so as to maintain its lower or operative end in the same vertical or raking position for all depths of the material, and such arrangement would be preferable where a wide conveyor is employed and where a narrow or small chute supplies the hopper. The action of the weighted member or "scrabbler" is principally required when the level of the material in the hopper is insufficient to enable the sluice or slide to effect a levelling and distribution of the material, under which condition heaping occurs to an extent which would be beyond the automatic levelling action of the measuring plate but which heaping is immediately spread out and levelled by the weighted member.

Figure 6:
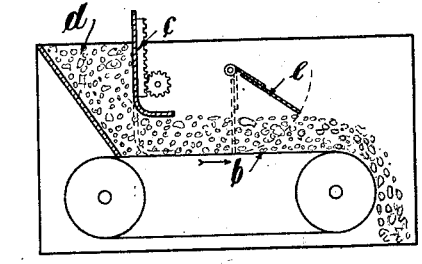

As shown in Fig. 6 the "scrabbler" is a curved plate formed in one with the sluice.

The invention is particularly applicable to the self-contained fuel measuring apparatus forming the subject of my prior patent application No. 636,761.

Figure 9:
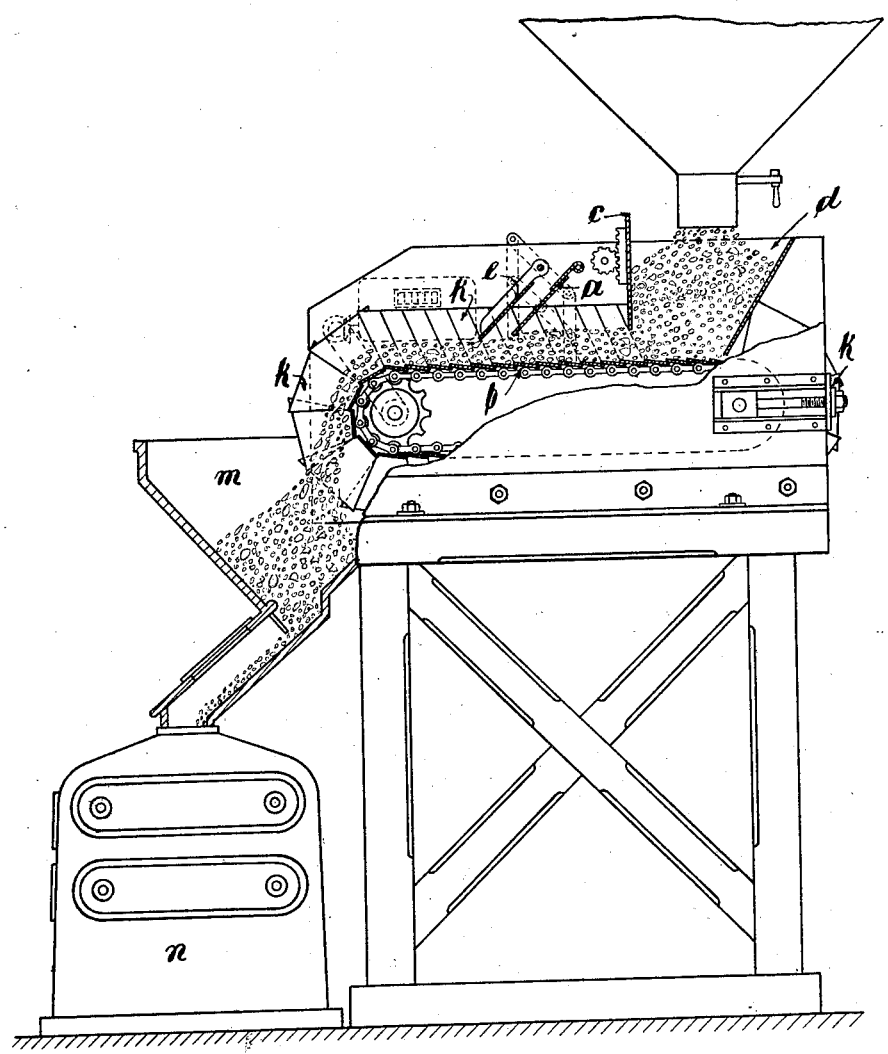
Fig. 9 is a sectional elevation of a complete machine.

The conveyor for use with the "scrabbler" where it is desired to measure grain or like fine materials, comprises sections, each of which is formed or provided with sides so that they shall collectively constitute a "tray" formation transversely, both when on the straight and while passing over the driving rollers. For this purpose, according to one arrangement as shown in Fig. 9, the sides $k$ of the sections are flat and fan-shaped and are arranged slightly inclined on their bases so as to lap over each other, that is, each fits inside the preceding section and outside the following section. Such a construction has the advantage that, while travelling in the straight, the sides of the conveyor sections lie closely enough together to substantially preclude leakage between them, said sides when passing over a carrier roller and delivering the material having an opening action assisting effective clearing of any material which might become lodged between them. Further, the material is carried along bodily in the tray, so avoiding the usual friction of the material against the side of the conveyor. The apparatus in Fig. 9 is shown delivering grain to a hopper $m$ supplying a grinder $n$.

The means for transmitting the movements of the measuring element to the integrator consists in simplified mechanism to replace the cam previously employed. One form of such mechanism (see Figs. 7 and 8) comprises parallel-motion link mechanism, consisting of an arm $o$ mounted on the shaft of the measuring element $e$, a similar arm $p$ parallel to arm $o$, pivotally mounted on the side of the apparatus immediately below the shaft of the measuring element and in the same plane with the arm on that shaft, and a connecting link $q$ between the free ends of said arms $o$ and $p$ arranged to have a parallel movement. The sliding member of the integrator is provided with two rollers $r$, $r^1$ between which the connecting link $q$ moves to impart the horizontal component of its movement to the sliding member of the integrator. As will readily be appreciated, such horizontal component is exactly proportional to the vertical component of the movement of the lower or effective edge of the measuring element $e$ and thus an accurate and positive transmission of the movement of that element is obtained proportional to the depth of material on the conveyor. For the purpose of balancing such transmission mechanism, the connecting arms $o$ and $p$ in the form shown on the drawings, are double-ended and a further equal and opposite connecting link $q^1$ is provided.

Figure 7:
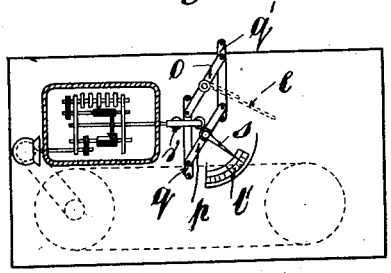
Figs. 7 and 8 illustrate diagrammatically the improved mechanism for transmitting the movement of the measuring element to the integrator.
Figure 8:
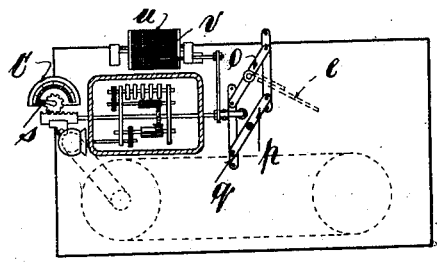

The integrator receives motion from the conveyor through any suitable gearing, such for instance as that shown in Figs. 7 and 8, and is driven at a speed proportional to the speed of the conveyor.

The rate of feed indicating mechanism consists of a pointer $s$, see Figs. 7 and 8 adapted to move over a fixed scale $t$. In Fig. 7 the pointer is carried by the arm $p$ of the link motion. In Fig. 8 the pointer is operated by a rack and pinion, the former being carried by the sliding member of the integrator. A recording chart $u$ is shown in Fig. 9 mounted on a rotary drum and coacting therewith is a pen $v$ operably connected to the sliding member of the integrator.

I claim:

1. In apparatus for effecting the volumetric measurement of granular materials, an endless conveyor, means for driving same, a hopper arranged above said conveyor for the granular material, a regulator or sluice for controlling the discharge of the material from the hopper, a pivoted measuring element, arranged above the conveyor, adapted to rise and fall on the surface of the material lying on the conveyor, an integrator, means for transmitting the movement of the measuring element to the variable member of the integrator, and means for driving the integrator from the conveyor, a weighted member or "scrabbler" arranged above the conveyor and between the hopper and the measuring element to rise and fall with the depth of the material on the conveyor and by its weight to spread it across the width of the conveyor.

2. In apparatus for effecting the volumetric measurement of granular materials, an endless conveyor, means for driving same, a hopper arranged above said conveyor for the granular material, a regulator or sluice for controlling the discharge of the material from the hopper, a pivoted measuring element, arranged above the conveyor, adapted to rise and fall on the surface of the material lying on the conveyor, an integrator, means for transmitting the movement of the measuring element to the variable member of the integrator, and means for driving the integrator from the conveyor, a weighted member or "scrabbler" comprising a pivoted plate having a wedge shaped formation to engage the material, arranged above the conveyor and between the hopper and the measuring element and adapted to rise and fall with the depth of the material on the conveyor and by its weight to spread it across the width of the conveyor.

3. In apparatus for effecting the volumetric measurement of granular materials, an endless conveyor, means for driving same, a hopper arranged above said conveyor for the granular material, a regulator or sluice for controlling the discharge of the material from the hopper, a pivoted measuring element arranged above the conveyor adapted to rise and fall on the surface of the material lying on the conveyor, an integrator, means for transmitting the movement of the measuring element to the variable member of the integrator, comprising parallel link mechanism, and means for driving the integrator from the conveyor, a weighted member or "scrabbler", arranged above the conveyor and between the hopper and the measuring element and adapted to rise and fall with the depth of the material on the conveyor and by its weight to spread it across the width of the conveyor.

4. In apparatus for effecting the volumetric measurement of granular materials, an endless conveyor, means for driving same, a hopper arranged above said conveyor for the granular material, a regulator or sluice for controlling the discharge of the material from the hopper, a pivoted measuring element arranged above the conveyor adapted to rise and fall on the surface of the material lying on the conveyor, an integrator, means for transmitting the movement of the measuring element to the variable member of the integrator, and means for driving the integrator from the conveyor, a weighted member or "scrabbler", arranged above the conveyor and between the hopper and the measuring element, and adapted to rise and fall with the depth of the material on the conveyor and by its weight to spread it across the width of the conveyor, and means for indicating the operation of the measuring element.

In testimony whereof I have signed my name to this specification.

JAMES EDWARD LEA.